(12) United States Patent
Haswell

(10) Patent No.: US 11,003,587 B2
(45) Date of Patent: May 11, 2021

(54) MEMORY SYSTEM WITH CONFIGURABLE NAND TO DRAM RATIO AND METHOD OF CONFIGURING AND USING SUCH MEMORY SYSTEM

(71) Applicant: SK hynix Inc., Gyeonggi-do (KR)

(72) Inventor: Jonathan Mark Haswell, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 20 days.

(21) Appl. No.: 16/403,009

(22) Filed: May 3, 2019

(65) Prior Publication Data

US 2019/0340134 A1 Nov. 7, 2019

Related U.S. Application Data

(60) Provisional application No. 62/666,384, filed on May 3, 2018.

(51) Int. Cl.
*G06F 12/1018* (2016.01)
*G06F 12/02* (2006.01)
*G06F 12/1045* (2016.01)

(52) U.S. Cl.
CPC ...... *G06F 12/1018* (2013.01); *G06F 12/0246* (2013.01); *G06F 12/1054* (2013.01); *G06F 2212/7201* (2013.01); *G06F 2212/7203* (2013.01)

(58) Field of Classification Search
CPC ............ G06F 12/0246; G06F 12/1009; G06F 12/1018; G06F 12/1054; G06F 2212/7201; G06F 2212/7203; G06F 2212/7207
See application file for complete search history.

(56) References Cited

U.S. PATENT DOCUMENTS

| | | | |
|---|---|---|---|
| 9,720,605 B2 | 8/2017 | Lin et al. | |
| 2012/0239851 A1* | 9/2012 | Calvert | G06F 3/0613 |
| | | | 711/103 |
| 2017/0249102 A1 | 8/2017 | Maeda et al. | |

* cited by examiner

*Primary Examiner* — Larry T Mackall
(74) *Attorney, Agent, or Firm* — IP & T Group LLP

(57) ABSTRACT

Memory systems that include NAND flash memory and dynamic random access memory (DRAM) are configured to allow a considerably higher ratio of NAND to DRAM without a significant increase in write amplitude. The NAND includes a logical-to-physical (L2P) table. The DRAM includes a buffer divided into regions, an update table of recently written data and linked lists, one for each region of the buffer linking all items in the update table in that region, the DRAM maintaining a set of linked lists, each identifying all regions with the same number of updates in the update table.

18 Claims, 13 Drawing Sheets

FIG. 10

| | |
|---|---:|
| NAND Capacity (TB) | 64 |
| NAND Capacity (B) | 70,368,744,177,664 |
| DRAM Capacity (GB) | 4 |
| DRAM Capacity (B) | 4,294,967,296 |
| MU Size (B) | 4,096 |
| # of MU | 17,179,869,184 |

FIG. 11

| | |
|---|---:|
| L2P Region size (B) | 4,096 |
| L2P Entry size (B) | 5 |
| Entries per region | 819 |
| No of regions | 20,976,641 |

FIG. 12

| | |
|---|---:|
| Size of Update Table (B) | 4,042,457,889 |
| Size of Update entry (B) | 14 |
| Number of entries in table | 288,746,992 |
| Practical hash max utilization | 75% |
| Practical max entries | 216,560,244 |
| Average entries per region | 10 |

FIG. 13

| Size of entry (B) | 12 |
|---|---|
| Size of table (B) | 251,719,695 |

FIG. 14

| Size of entry (B) | 4 |
|---|---|
| Size of table (B) | 3,280 |

FIG. 15

| Buffer size (B) | 4,096 |
|---|---|
| No of buffers | 128 |
| Buffer space | 524,288 |

FIG. 16

| Log entry size | 10 |
|---|---|
| Log buffer size (B) | 4,096 |
| No of log buffers | 64 |
| Buffer space (B) | 262,144 |

FIG. 17

| L2P Coalescing | 397 |
|---|---|
| Update Log | 10 |
| Update section:Log ratio | 3 |
| Update section flush | 30 |
| Total WA | 1.11 |

MEMORY SYSTEM WITH CONFIGURABLE NAND TO DRAM RATIO AND METHOD OF CONFIGURING AND USING SUCH MEMORY SYSTEM

CROSS-REFERENCE TO RELATED APPLICATION

This application claims the benefit of U.S. Provisional Application No. 62/666,384, filed May 3, 2018, the entire content of which is incorporated herein by reference.

BACKGROUND

1. Field

Embodiments of the present disclosure relate to a memory system that is configured and used to increase performance and longevity and method of operating such memory system.

2. Description of the Related Art

The computer environment paradigm has shifted to ubiquitous computing systems that can be used anytime and anywhere. As a result, the use of portable electronic devices, such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

The two main types of flash memories are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NOR-type flash allows a single machine word (byte) to be written to an erased location or read independently. The NAND-type flash memory operates primarily in memory cards, USB flash drives, solid-state drives (SSDs), and similar products, for general storage and transfer of data.

In conventional SSDs it is typical to use dynamic random access memory (DRAM) to hold a translation table relating logical addresses of sectors of data and their respective physical addresses identifying corresponding physical locations in the NAND.

When a host system writes a sector of data to the SSD, the host supplies the logical address with the data to be written. The SSD selects a physical location in the NAND where the data is to be stored and makes an entry in the translation table, using the logical address as an index, where the contents of the table is the physical address. When the host reads back the data, the host supplies the logical address to the SSD, which uses it as an index in the translation table to determine the physical address of the data in the NAND, which is then retrieved and returned to the host.

As in most SSDs in use today, the contents of the NAND can be addressed by 32 bits, i.e., 4 byte entries, and the units of data stored from the host are 4 KB, so the SSD requires a ratio of 1000:1 of NAND capacity to DRAM size. That is, 4 bytes of space for an entry in the translation table to store 4096 bytes of user data in the NAND. As the capacity of the SSD grows, the size of DRAM required increases at a minimum according to this ratio, and with the cost of the DRAM and the circuitry required to access it, this adds considerable cost to the SSD. This problem is made worse when the physical capacity of the SSD requires more than 32 bits to address, and each entry in the translation table requires 5 bytes instead of 4 bytes, lowering the ratio of NAND to DRAM to 800:1, and eventually to 666:1 when 6 bytes are required per entry.

The classic approach to reduce the quantity of DRAM required is to utilize the DRAM simply as a cache for the translation table. Only the portion of the translation table required for the specific host read or write operation is loaded into DRAM at one time. While this is a tolerable solution in many cases for host read operations, it causes very significant problems on write operations. Specifically, when the host writes a logical sector of data, say 4K, the appropriate portion of the translation table will have to be loaded into the DRAM, updated and then written back to the NAND. Typically, the translation table is read and then stored to the NAND in 4K chunks. This means that for a single host write of 4K, 8K of data has to be written to the NAND, 4K of user data and 4K of translation table data. This doubles the write amplification, halving the life of the SSD, and significantly impacts performance.

In this context embodiments of the present invention arise.

SUMMARY

Aspects of the present invention include memory systems including memory controllers and memory devices. In one aspect, a memory system comprises a flash memory including a logical-to-physical (L2P) table; and a random access memory (RAM) including a buffer divided into regions, an update table of L2P entries of recently written data and linked lists, one for each region of the buffer linking all entries in the update table in that region, the RAM maintaining a set of linked lists, each identifying all regions with the same number of updates in the update table. During operation, only a portion of the L2P table is loaded into the RAM buffer. Also, the update table is saved to the flash memory by regularly writing sections of the update table, in round robin order, along with a log of all writes that occurred, to the flash memory, and the update table is rebuilt to reflect its content at a time prior to a specific event by reading in all the sections of the update table previously saved to the flash memory and then updating them based on the write log.

In another aspect, a memory system comprises a flash memory including a logical-to-physical (L2P) table; and a dynamic random access memory (DRAM) comprising a buffer divided into regions, a region table, an update table of write operations, the update table including entries, each identifying a physical address where associated data is stored in the flash memory and a logical address of the associated data, and a flush table of an array of pointers to linked lists, each linked list linking all entries in the region table having the same number of updates in the update table.

In another aspect, a memory system comprises a dynamic random access memory (DRAM) including a logical-to-physical (L2P) buffer, an update table, a region table, a flush table and an update log; and a NAND including an L2P table, and update table persistent storage and an update log persistent storage. The update table maintains L2P entries of recently written data before the L2P entries are written to the L2P table, the update table containing linked lists, one for each region of the buffer linking all items in the update table in that region, and the DRAM maintains a set of linked lists, each identifying all regions with the same number of updates in the update table.

Other aspects of the present invention include methods of operating a memory system. In this regard, another aspect of the present invention, entails a method of operating a memory system comprising a flash memory and a dynamic random access memory (DRAM). The method comprises loading a portion of a logical-to-physical (L2P) table of the flash memory into an L2P buffer of the DRAM; maintaining an update table in the DRAM of L2P entries of recently written data; maintaining a linked list data structure comprising a linked list for each region of the L2P buffer that links all entries in the update table in that region; and maintaining a set of linked lists, each identifying all regions in the L2P buffer with a same number of updates in the update table.

Additional aspects of the present invention will become apparent from the following description.

BRIEF DESCRIPTION OF THE DRAWINGS

FIGS. 10-17 are chart showing various drive parameters in accordance with embodiments of the present invention.

DETAILED DESCRIPTION

Figure 1:
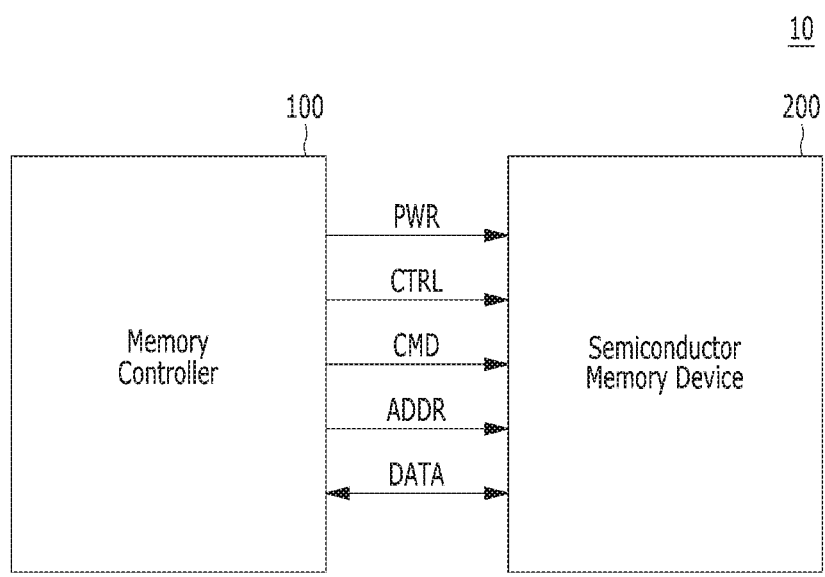
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring FIG. 1, the memory system 10 may include a memory controller 100 and a semiconductor memory device 200, which may represent more than one such device. The semiconductor memory device(s) 200 may be flash memory device(s), particularly of the NAND-type. For brevity, semiconductor memory device 200 is sometimes simply referred to as memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC) card, and/or a universal flash storage (UFS).

In another embodiment, the memory system 10 may be provided as one of various components in an electronic device, such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
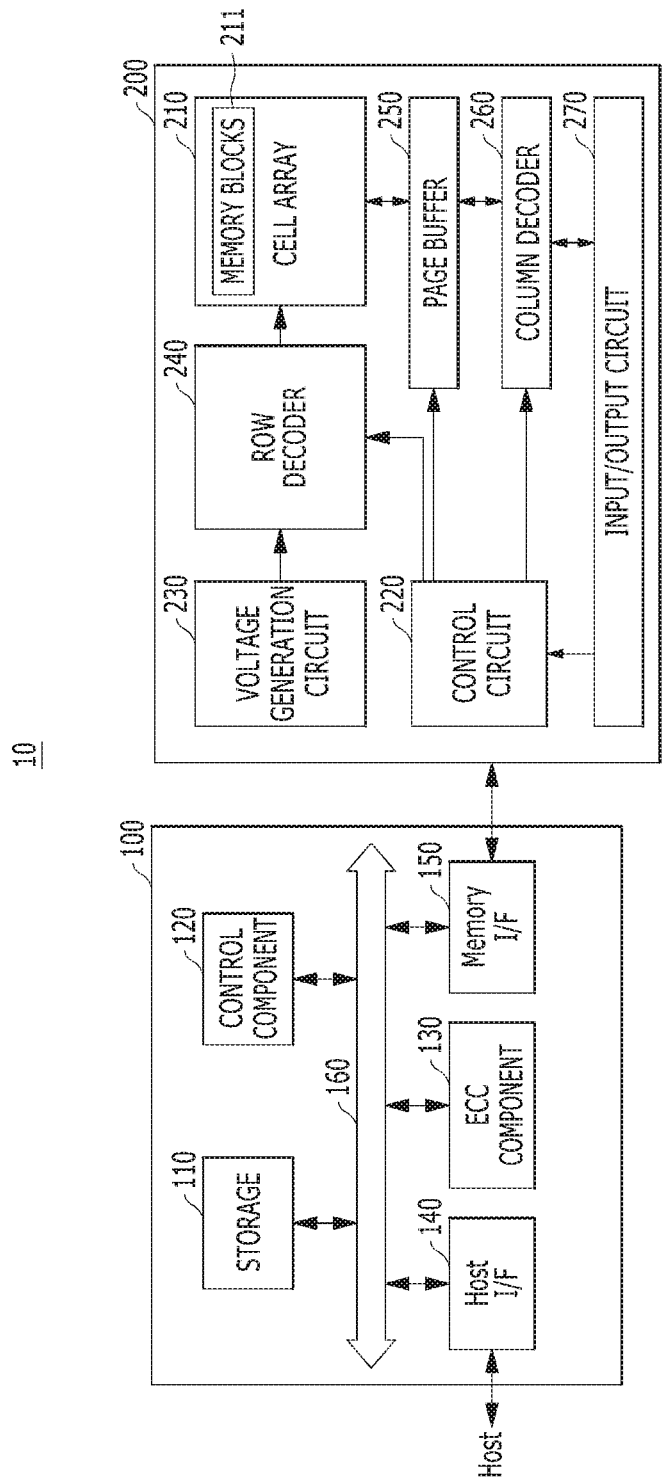
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device, such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device, such as a mobile phone, a smart phone, an e-book, an MP3 player, a portable multimedia player (PMP), and/or a portable game player.

The semiconductor memory device 200 may store data to be accessed by the host device.

The semiconductor memory device 200 may be implemented with a volatile memory device, such as a dynamic random access memory (DRAM) and/or a static random access memory (SRAM) or a non-volatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor, e.g., a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations, such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

The ECC component 130 may perform an error correction operation based on a coded modulation, such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM).

The host interface 140 may communicate with the host device through one or more of various interface protocols, such as a universal serial bus (USB), a multi-media card (MMC), a peripheral component interconnect express (PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component or CPU 120. When the memory device 200 is a flash memory such as a NAND flash memory, the memory interface 150 may generate control signals for the memory and process data under the control of the CPU 120.

The semiconductor memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
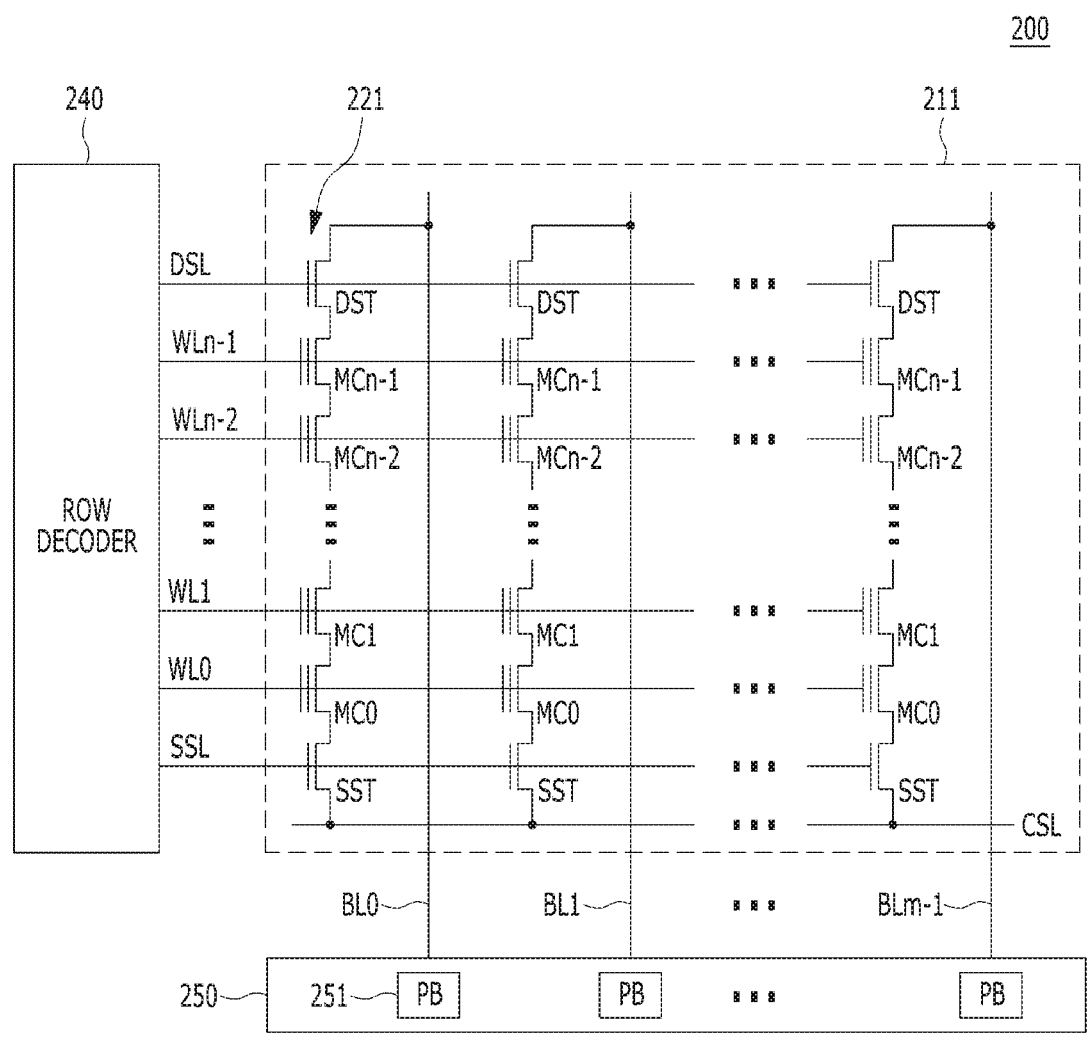
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer 250 may be in the form of a page buffer array including a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Embodiments of the present invention are directed to configurable memory systems in which the ratio of NAND to DRAM is allowed to rise considerably higher than 1000:1 without a significant increase in write amplification.

Figure 4:
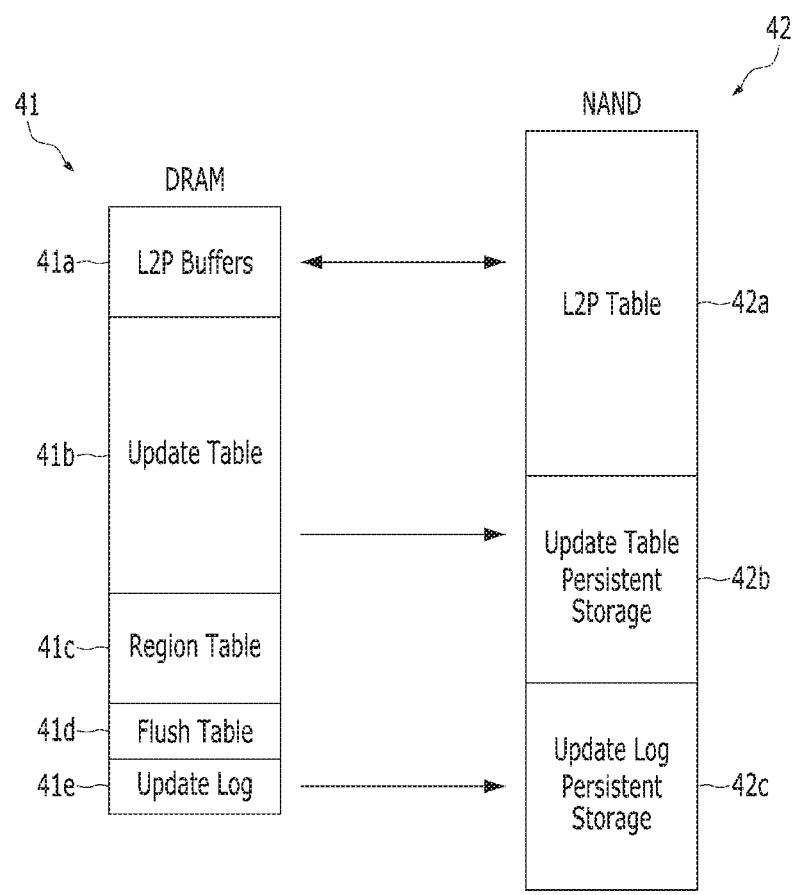
FIG. 4 is a schematic diagram of a dynamic random access memory (DRAM) and a NAND of a memory system in accordance with an embodiment of the present invention.

To that end, FIG. 4 illustrates, in the context of an SSD 40, configuration of a DRAM 41 and a NAND 42 in accordance with an embodiment of the present invention. The DRAM 41 includes L2P one or more buffers 41a, and update table 41b, a region table 41c, a flush table 41d, and an update log 41e. The NAND 42 includes an L2P table 42a, an update table persistent storage 42c.

The L2P table 42a stored in the NAND 42 is the primary table for translating a logical sector/LBA address of the host to the physical location where the corresponding data is stored in the NAND 42. The L2P table 42a, however, is not stored or loaded into the DRAM 41 in its entirety; rather, portions of the L2P table 42a are brought into the L2P buffers 41a of the DRAM 41, which buffers act as temporary storage or a cache when required. To facilitate this operation, the L2P buffers 41a are divided into regions. A region is the unit of data that is read from, or written to, the L2P buffers 41a.

The update table 41b in the DRAM 41 is used to hold L2P translation entries for all newly written data before these entries are written to the (main) L2P table 42a. The update table 41b is structured as a hash table to facilitate fast lookup for locations of data.

In addition to being organized as a hash table all entries in the update table 41*b* are connected as a set of linked lists. There is one list for each region in the L2P table 42*a*, with the head entry for each region pointed to from the region table 41*c* of the DRAM 41. It is possible to identify each entry in the update table 41*b* for a specific region in the L2P table 42*a* by scanning the list for that region pointed to by the region table 41*c*.

The linked lists pointed to by the region table 41*c* are of varying length, depending on how many writes have occurred to each region. The flush table 41*d* is used to maintain a data structure that keeps a sorted view of the number of entries in each region's linked lists. Specifically, the flush table 41*d* contains a series of pointers to entries in the region table 41*c* that have equal size linked lists, i.e., there is a first linked list in the region table 41*c*, pointed to by an entry in the flush table 41*d*, for all regions that have zero entries, a second linked list for all regions that have one entry, up to an nth linked list for regions that have n-1 entries. The flush table 41*d* is effectively an array, indexed by the size of a region's updates, with each entry in the array pointing at a linked list of regions with equal number of updates.

The content of the update table 41*b* is stored to persistent storage, i.e. update table persistent storage 42*b* of NAND 42, as the update table 41*b* contains the only record of recently written data. To avoid needing extended time/hold-up energy this storing is not done at power-on but as a continuous background process. Every host write operation inserts an entry in the update table 41*b* and in addition is written into the update log 41*e*. When the space for the update log 41*e* is full, or stored content therein has reached a specific threshold, then the update log 41*e* and one section of the update table 41*b* is written to the update log persistent storage 42*c* and the update table persistent storage 42*b* respectively in the NAND 42. When power is restored after a power shutdown, the update table 41*b* in the DRAM 41 is rebuilt to its former state by reading in all of the sections from the update table persistent storage 42*b* and updating this with the latest entries from the update log persistent storage 42*c*.

Figure 5:
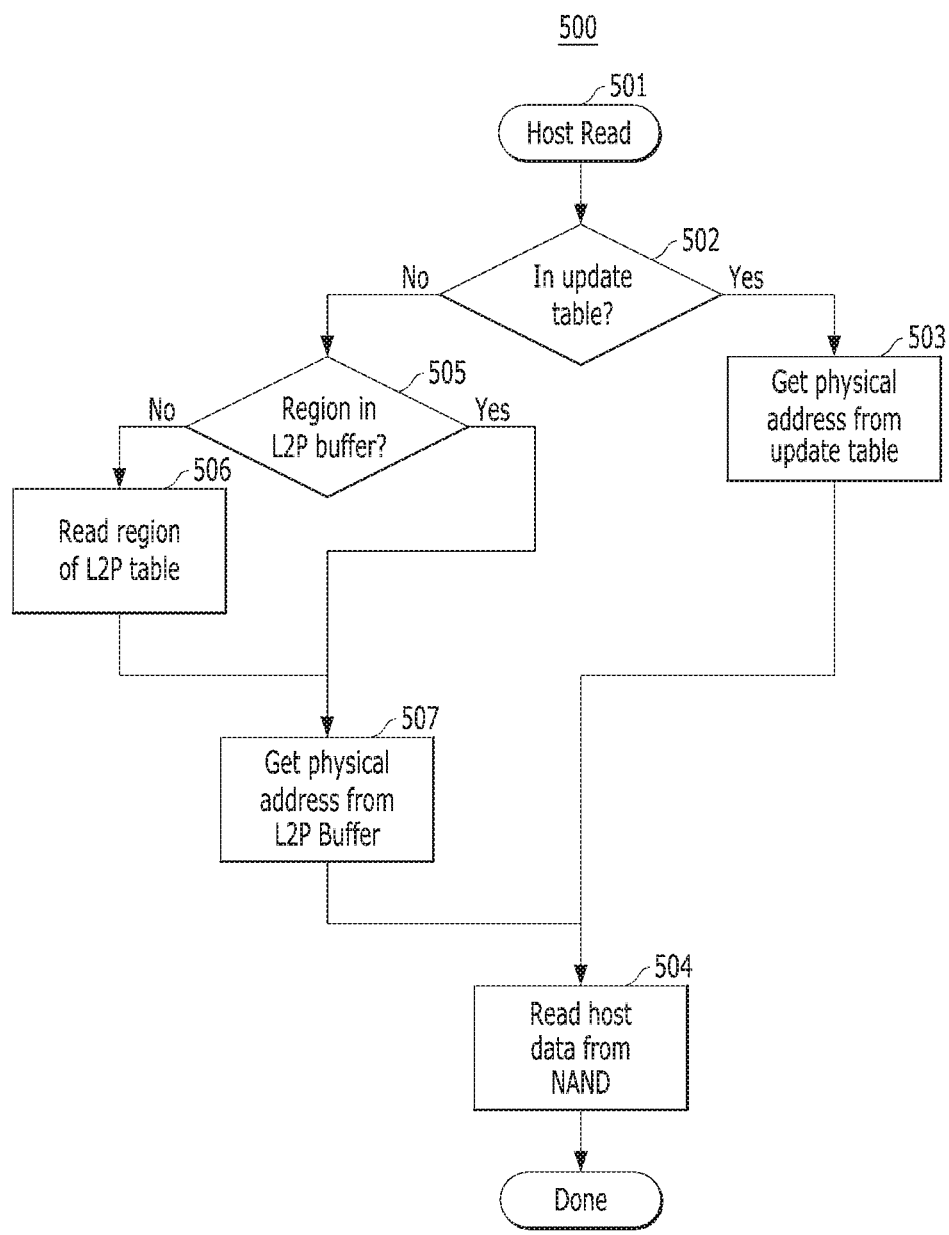
FIG. 5 is a flow chart illustrating a host read operation in accordance with an embodiment of the present invention.

FIG. 5 is a flow chart 500 showing a host read operation.

When a host read request is received at step 501, a check is first performed in the update table 41*b* at step 502, which table would contain an entry as to the physical location in the NAND 42 if that location had been recently written to. If the entry is found (Yes at 502), then this address is used for the read from the NAND 42. That is, the physical address is obtained from the update table 41*b* at step 503, and the requested data is read from the NAND 42 at step 504.

Returning to step 502, if the logical address requested is not found in the update table 41*b* (No at 502), then a check is performed at step 505 to determine if the region of the L2P table 42*a* that contains this logical address is currently loaded into one of the L2P buffers 41*a*. If not then, the required region of the L2P table 42*a* in the NAND 42 is loaded into one of the L2P buffers 41*a*, which may first involve evicting another region. Once the region is loaded in an L2P buffer 41*a*, the logical address is looked up at step 506 and the physical address determined at step 507, which physical address is then used to read the requested data from the NAND 42 at step 504. After step 504, the host read operation is done.

Figure 6:
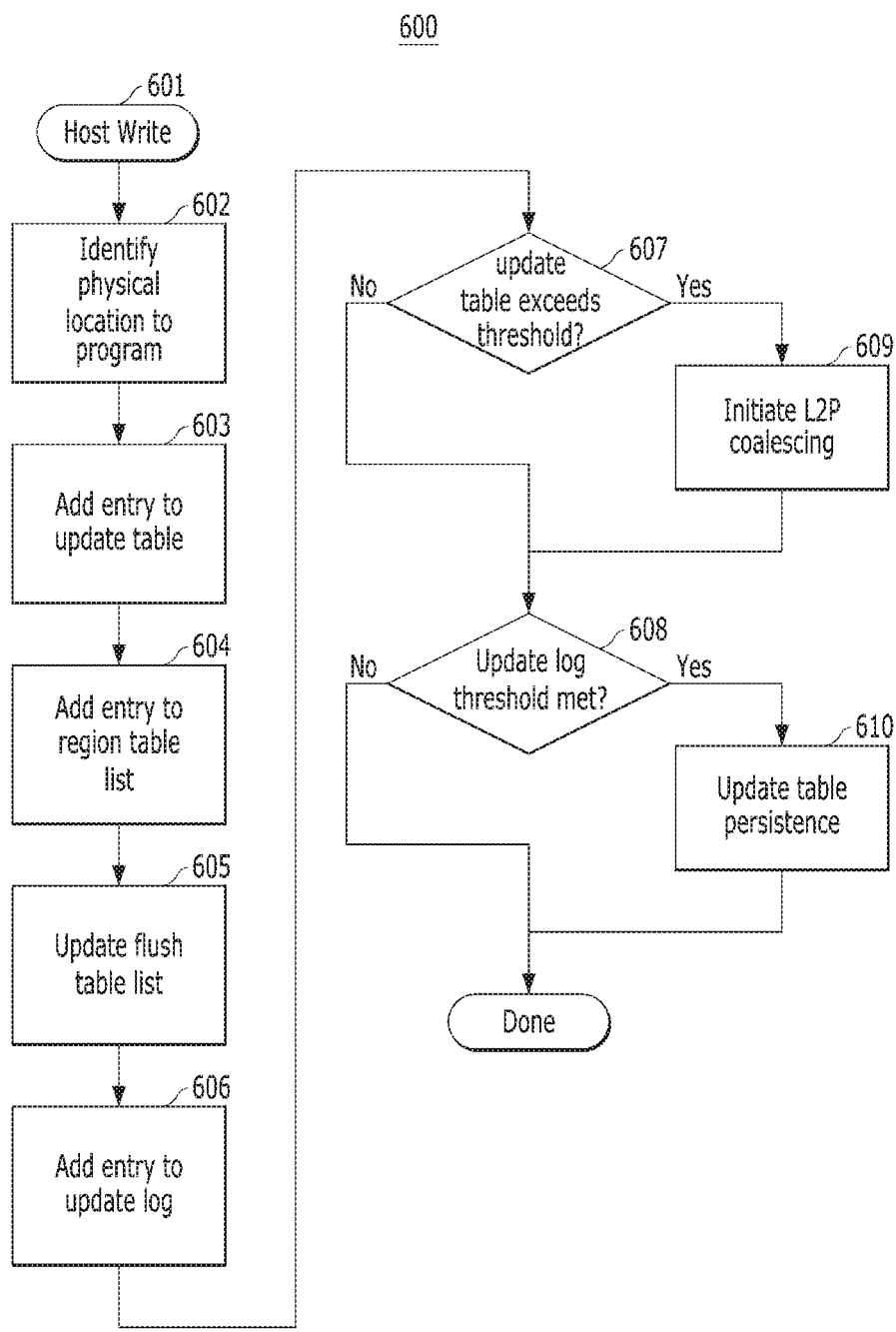
FIG. 6 is a flow chart illustrating a write operation in accordance with an embodiment of the present invention.

FIG. 6 is a flow chart 600 showing a write operation.

When the host initiates a write at step 601, the next physical location in the NAND 42 to program is identified at step 602, and a new entry is created in the update table 41*b* to map the logical address of the data being written to this physical address at step 603. This entry in the update table 41*b* is then added to the appropriate region linked list pointed to by the region table 41*c* at step 604, and this region linked list is moved to be a part of the appropriate flush list based on the number of entries in the region list at step 605. Then, the entry is added to the update log 41*e* at step 606.

Figure 7:
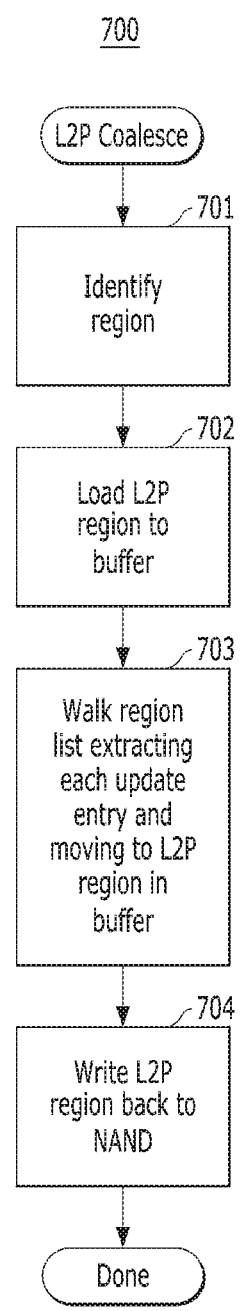
FIG. 7 is a flow chart illustrating a coalescing operation in accordance with an embodiment of the present invention.

Once this is done two further checks are performed at steps 607 and 608. If the number of entries in the update table 41*b* exceeds a threshold (Yes at step 607), a background process is initiated to transfer all entries from the region in the update table 41*b* with the most entries into the appropriate region in the L2P table 42*a* at step 609, which is referred to as L2P coalescing and which is further described in connection with FIG. 7.

The second check at step 608 is whether the update log 41*e* has exceeded the threshold at which it should be flushed to the NAND 42, along with the updating the update table 41*b*. If it is determined that the update log 41*e* has exceeded its flush threshold (Yes at step 608), this flushing is initiated as a background operation, and at step 610, the update table persistent storage 41*b* is updated. After that, the process is done. If the determination at step 608 is No, the process also is done.

Every host write operation increases the number of entries in the update table 41*b*, and eventually these entries need to be purged and permanently stored in the L2P table 42*a* of the NAND 42. Thus, an L2P coalescing operation 700 is performed as shown in the flow chart of FIG. 7.

When operation 700 is triggered, the first step is determined which region to coalesce. Thus, at step 701, a region to coalesce is identified. There are different ways to carry out step 701 according to various algorithms. One algorithm selects the region with the most entries in the update table 41*b*, based on the entries in the flush table 41*d* that tracks the number of entries per region. Other algorithms look at the access pattern to each region or other such statistics.

Once the region has been selected, the L2P table region that corresponds to it is loaded into an L2P buffer 41*a* at step 702. Then, each entry in the update table 41*b* for that region, determined by following the linked list for the selected region from the region table 41*c*, is moved from the update table 41*b* to the L2P buffer 41*a* at step 703.

Once all updates have been made to the L2P buffer 41*a*, the L2P region is written back to the NAND 42 at step 704. This may occur immediately or soon after all updates have been made to the L2P buffer 41*a*, or the L2P region may be marked as dirty requiring later writing to NAND. The operation is then done.

Figure 8:
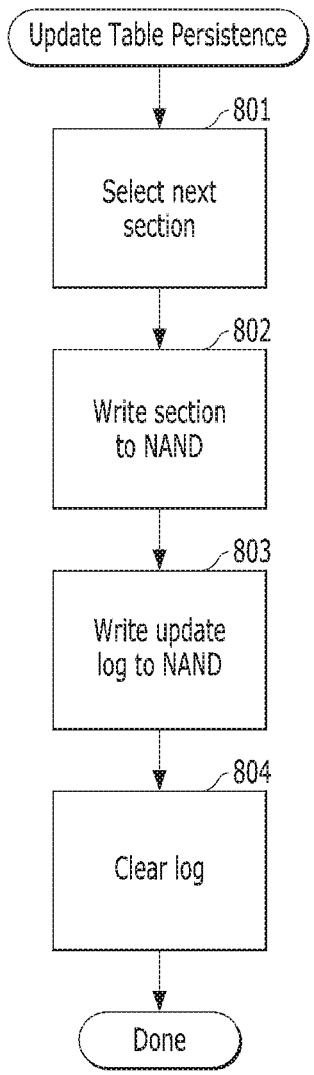
FIG. 8 is a flow chart illustrating an update table persistence operation in accordance with an embodiment of the present invention.

Another operation is to ensure that the update table 41*b* is persistent over power cycles, as such table contains the only record of recent writes (update table persistence). That is done by regularly writing sections of the update table 41*b*, in round robin order, plus a log of all writes that occurred, to the NAND 42 as a pseudo background operation. The flow of such update table persistence 800 is shown in FIG. 8.

The trigger for writing the next section to the NAND 42 is the number of writes of user data since the last section was written out to NAND 42, that is, when the log of the writes reaches a specific threshold depth. Thus, the next section is selected on this basis at step 801. This selected section is written to the NAND 42 at step 802. Alongside the section, the entire update log is also written to the NAND at step 803. Once these writes are complete, the log is flushed at step 804, and normal user data writes are allowed to continue.

With the update log and the sections of the update table 41b written to the NAND 42, the update table 41b can be rebuilt to reflect its content at a time immediately prior to a power loss event by reading in all the sections of the update table 41b and then updating them based on the write log.

Figure 9:
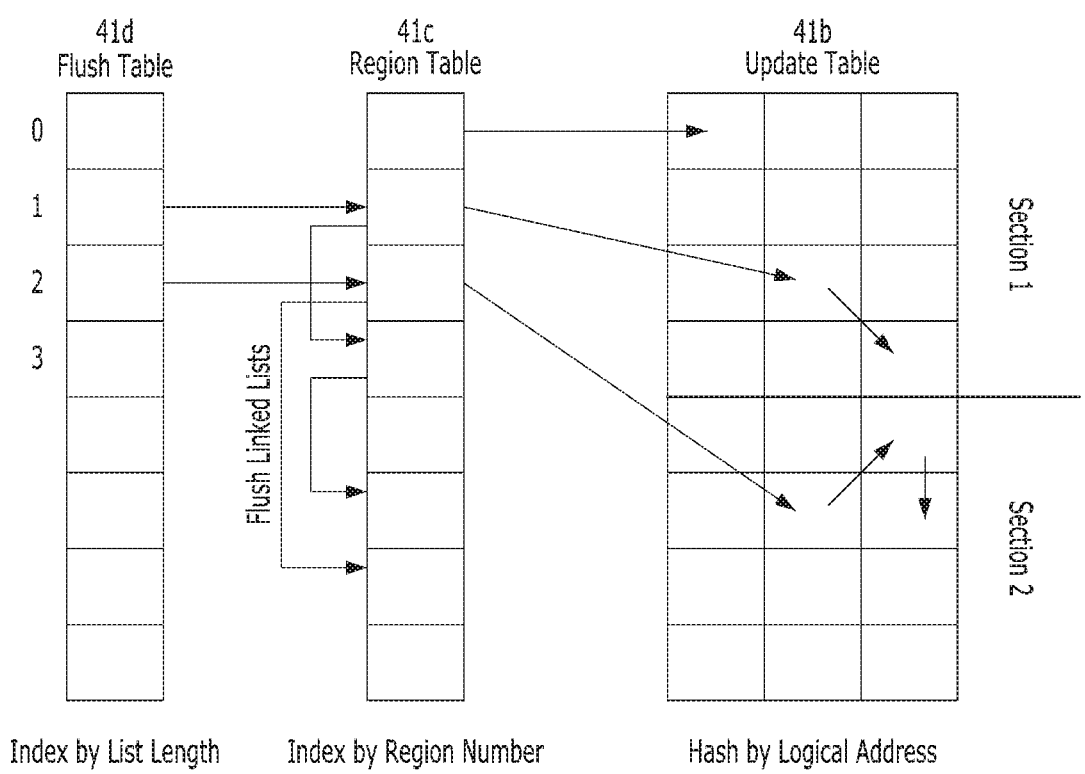
FIG. 9 is a schematic diagram illustrating a flush table, a region table and an update table of a memory system in accordance with an embodiment of the present invention.

Referring now to FIG. 9, an exemplary data structure formed by the flush table 41d, the region table 41c and the update table 41b of the DRAM 41 is shown.

The flush table 41d may be an array of pointers to linked lists, which connect all entries in the region table 41c that have the same number of entries in the update table 41b. For example, if regions 2 and 7 each have five (5) entries in the update table 41b, then they are formed in a linked list anchored at index 5 in the flush table 41d. The flush table 41d is indexed by list length.

The region table 41c may also be an array of pointers to linked lists. The linked lists connect all entries in the update table 41b that are in the same region. The region table 41c is indexed by region number.

The update table 41b may be a hash table of write operations with the entries itemizing the logical and physical address where the data is stored in the NAND 42.

The data structure depicted in FIG. 9 may be utilized in various ways according to embodiments of the present invention.

For example, to determine whether there is written data for a specific logical address, a lookup may be performed in the update table 41b by taking a hash of the logical address. Another exemplary operation entails finding every entry in the hash table that falls within a specific region of the L2P table 42a. In that case, the region number is used as an index into the region table 41c and followed to the linked list to which it points. Still another example entails finding a region or regions having a specific number of updates. This is done by using the specific number of updates as an index into the flush table 41d and following the linked list to which it points.

In one embodiment, the linked list of updates for each region is a single linked list. When a new update is placed in the update table 41b, then it can be added to the head of the list. Then, coalescing regions' updates into the L2P table 42a simply involves following the list and then discarding the entire list when the operation is complete.

The linked lists pointed to from the flush table 41d may be doubly linked. When an update is added to the update table 41b, the entry in the region table 41c from the current flush linked list it is in is removed and moved to the flush linked list that represents regions with one greater number of updates. The primary use of the flush table 41d is to efficiently sort and keep sorted a list of the number of updates in each region so that when a region is to be selected to coalesce, the region with the most updates in the update table 41b can be selected by going to the highest index in the flush table 41d, without requiring an extensive search operation.

Next, operation analysis is presented to demonstrate various features of the invention and their benefits. The specific parameters provided below are exemplary only. Other parameters may be used, as those skilled in the art will understand in light of the present disclosure. The following operational analysis is in the context of a 64 TB drive using 4 GB of DRAM. The basic parameters of the drive are listed in FIG. 10.

The 64 TB drive uses traditional 4K MUs (Management Units). That is, the unit of logical to physical translation is 4K. Thus, there are 17,179,869,184 MUs to manage. The sizes of regions are then defined as shown in FIG. 11.

Defining a region to be 4KB, which is the same size as an MU, is a good tradeoff between the write amplification (WA) generated and the size of tables. Here, each entry in the L2P table 42a is 5 bytes to accommodate over 32 bits per entry due to the size of the drive—at least as a worst case assumption. This means each region can fit 819 entries. Hence, 20,976,641 regions are needed to track all MUs.

The size of the update table 41b is defined as all available DRAM; that is, other overheads are taken into consideration. The size of each entry is 14 bytes, which includes 5 bytes for the logical address, 5 bytes for the physical address and 4 points for the pointer that makes up the region linked list (singly linked list in this case). It is assumed that the system can use 4 byte pointers to items in the DRAM as this is limited to 4 GB. The sizing of the update table 41b is shown in FIG. 12.

Here, it is assumed that the update table 41b, i.e., hash table, can be filled to 75% only, so as to maintain efficiency. Thus, it can be calculated that the update table 41b can contain 216,560,244 actual entries and this means that, on average for a random workload, there are 10 entries per region.

The region table 41c is sized as shown in FIG. 13. Each entry in the region table consists of 3 pointers, one into the update table 41b for the region linked list and 2 pointers to facilitate forming the doubly linked flush linked list. Given the 20,976,641 regions, this gives the region table 41c a size of 251,719,695 bytes.

The flush table 41d is defined as shown in FIG. 14. Each entry is 4 bytes, a pointer to the head entry in the region table 41c for a region with the specified number of updates in its linked list. To accommodate all possible counts of updates per region, 820 slots are need in the flush table 41d, which takes 3,276 bytes of memory.

As for the L2P buffers 41a and the update log 41e, their allocations may be set as shown in FIGS. 15 and 16 respectively. These allocations are somewhat arbitrarily set. Other suitable allocations may be used.

From the above configuration, the write amplification (WA) resulting from the maintenance of all the tables defined above can be calculated.

For every 4K host write, additional bytes of data are written for the L2P coalescing, writing the update log 41e and writing out sections of the update table 41b. Thus, the WA is calculated as 1.11, as shown in FIG. 17.

Based on the WA calculation above, when one region of data is coalesced from the update table 41d into the L2P table 42a, it will, on average, contain 10 entries and hence, per entry, contributes 397 bytes of data to write. In addition to this, the entry for each write from the update log 41e needs to be written out, each entry being 10 bytes. Also, sections of the update table 41d are written to the NAND 42. The frequency of these write operations is determined by the desired recovery time. In one example, a ratio of 3:1 is used. That is, 3 bytes are written out from the update table 41b for each byte written in the update log 41e. In total, this means that for every 4096 bytes of user data written out of the NAND 42, 4,533 bytes of data is written to the NAND 42, giving a WA of ~1.11. By comparison, a classic SSD with a cached FTL where, for a large drive with pure random workload, every host write causes a write of a section of the L2P table to the media, driving a WA of 2 or even slightly greater.

Thus, embodiments of the present invention advantageously provide a memory system configured to reduce WA, which in turn increases the life of the memory system, as well as improves its performance. Also, DRAM costs may be reduced.

Figure 18:
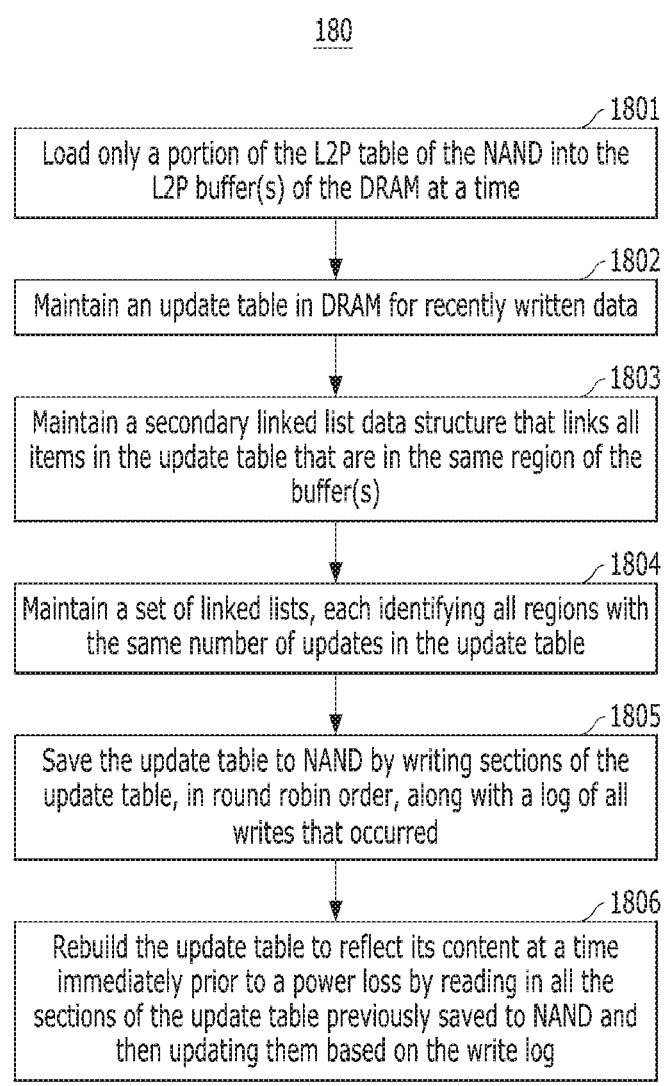
FIG. 18 is a flow chart illustrating steps in processes for operating a memory system in accordance with embodiments of the present invention.

FIG. 18 is a flow chart describing steps in processes for operating a memory system, preferably including an SSD, in accordance with embodiments of the present invention. The steps shown in flow chart 180 are exemplary and illustrate one aspect of operation. Those skilled in the art will understand that additional and/or alternative steps may be performed, or that the order of steps may be changed, to effectuate aspects of the present invention without departing from the inventive concepts disclosed herein.

At step 1801, only a portion of the L2P table 42a into the L2P buffer(s) 41a in the DRAM 41 at one time.

At step 1802, an update table 41b, which is preferably configured as a hash table, is maintained for recently written data. The update table 41b contains an entry of the physical location in the NAND 42.

At step 1803, a secondary linked list data structure is maintained. Such data structure links all items in the update table 41b that are in the same region of the L2P buffer(s) 41a as a linked list. In one embodiment, there is a linked list for each region of the L2P table 42a, which list links all items in that region.

At step 1804, a set of linked lists is maintained. Each list of the set identifies all regions with the same number of updates in the update table 41b.

The update table 41b is saved to persistent storage in the NAND 42 and restored using a round robin approach. The update table 41b is rebuilt when power is restored following a power loss. These operations are shown in steps 1805 and 1806 of FIG. 18.

More specifically, at step 1805, the update table 41b is saved to the NAND 42 by writing sections of the update table 41b, in round robin order, along with a log of all writes that occurred to the NAND 42.

At step 1806, the update table 41b is rebuilt to reflect its content at a time immediately prior to the power loss by reading in all the sections of the update table 41b previously saved to the NAND 42 and then updating them based on the write log.

As the foregoing demonstrates, embodiments of the present invention provide memory system configurations in which the ratio of NAND to DRAM is allowed to rise to a relatively high level, e.g., considerably higher than 1000:1 without a significant increase in write amplitude. As such, embodiments of the of the present invention increase performance of memory systems without reduction in lifespan.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A memory system comprising:
    a flash memory including a logical-to-physical (L2P) table;
    a random access memory (RAM) including a buffer divided into regions, an update table of L2P entries of recently written data and linked lists, one for each region of the buffer linking all entries in the update table in that region, the RAM maintaining a set of linked lists, each identifying all regions with the same number of updates in the update table;
    wherein during operation,
        only a portion of the L2P table is loaded into the RAM buffer,
        the update table is saved to the flash memory by regularly writing sections of the update table, in round robin order, along with a log of all writes that occurred, to the flash memory, and
        the update table is rebuilt to reflect its content at a time prior to a specific event by reading in all the sections of the update table previously saved to the flash memory and then updating them based on the write log.

2. The memory system of claim 1, wherein the flash memory device is a NAND-type flash memory, the RAM is a dynamic random access memory (DRAM), and the NAND-type flash memory and DRAM are part of a solid state drive (SSD).

3. The memory system of claim 1, wherein the update table is configured as a hash table.

4. The memory system of claim 3, wherein the update table holds the L2P entries of newly written data before the L2P entries are written to the L2P table of the flash memory.

5. The memory system of claim 1, wherein the specific event is power loss.

6. The memory system of claim 5, wherein the update table is rebuilt when the power is restored following the power loss.

7. A memory system comprising:
    a flash memory including a logical-to-physical (L2P) table; and
    a dynamic random access memory (DRAM) comprising
        a buffer divided into regions,
        a region table,
        an update table of write operations, the update table including entries, each identifying a physical address where associated data is stored in the flash memory and a logical address of the associated data, and
        a flush table of an array of pointers to linked lists, each linked list linking all entries in the region table having the same number of updates in the update table.

8. The memory system of claim 7, wherein the update table is organized as a hash table.

9. The memory system of claim 8, wherein written data for a specific logical address is identified by performing a look-up operation in the hash table.

10. The memory system of claim 9, wherein the look-up operation is performed by taking a hash of the logical address of the written data.

11. The memory system of claim 8, wherein an entry in the hash table in a specific region of the L2P table is identified by using a number of the specific region as an index to the region table.

12. The memory system of claim 8, wherein a region with a specific number of updates is identified by using the number of updates as an index to the flush table.

13. A method of operating a memory system comprising a flash memory and a dynamic random access memory (DRAM), the method comprising:
    loading a portion of a logical-to-physical (L2P) table of the flash memory into an L2P buffer of the DRAM;
    maintaining an update table in the DRAM of L2P entries of recently written data;
    maintaining a linked list data structure comprising a linked list for each region of the L2P buffer that links all entries in the update table in that region; and
    maintaining a set of linked lists, each identifying all regions in the L2P buffer with a same number of updates in the update table.

14. The method of claim 13, further comprising:
saving the update table to the flash memory by writing sections of the update table, in round robin order, along with a log of all writes that occurred to the flash memory.

15. The method of claim 14, further comprising:
rebuilding the update table to reflect its content at a time prior to a specific event by reading in all the sections of the update table previously saved to the flash memory and then updating them based on the write log.

16. The method of claim 13, wherein the update table is organized as a hash table.

17. A memory system comprising:
a dynamic random access memory (DRAM) including a logical-to-physical (L2P) buffer, an update table, a region table, a flush table and an update log;
a NAND including an L2P table, and update table persistent storage and an update log persistent storage; wherein
the update table maintains L2P entries of recently written data before the L2P entries are written to the L2P table, the update table containing linked lists, one for each region of the buffer linking all items in the update table in that region, and
the DRAM maintains a set of linked lists, each identifying all regions with the same number of updates in the update table.

18. The memory system of claim 17, wherein the update log and content of the update table is stored to the update log persistent storage and the update table persistent storage respectively when the update log is full.

* * * * *